US006718688B2

(12) United States Patent
Garretson

(10) Patent No.: US 6,718,688 B2
(45) Date of Patent: Apr. 13, 2004

(54) AUTOMATIC ROACH TRAP HAVING DISPOSABLE CONTAINER THEREIN

(76) Inventor: John E. Garretson, 3521 E. Rose La., Paradise Valley, AZ (US) 85283

( * ) Notice: Subject to any disclaimer, the term of this patent is extended or adjusted under 35 U.S.C. 154(b) by 0 days.

(21) Appl. No.: 10/004,162

(22) Filed: Oct. 30, 2001

(65) Prior Publication Data

US 2002/0056223 A1 May 16, 2002

Related U.S. Application Data

(60) Provisional application No. 60/243,987, filed on Oct. 30, 2000.

(51) Int. Cl.[7] .............................................. A01M 1/10
(52) U.S. Cl. ................ 43/121; 43/111; 43/73
(58) Field of Search ........................ 43/107, 111, 117, 43/119, 121, 64, 65, 73, 74, 60, 61, 131, 58, 62, 69, 70, 71, 72, 99, 124, 132.1

(56) References Cited

U.S. PATENT DOCUMENTS

| | | | | | |
|---|---|---|---|---|---|
| 1,493,132 | A | * | 5/1924 | Strong | 43/107 |
| 2,445,166 | A | * | 7/1948 | Crumrine | 43/99 |
| 3,773,203 | A | * | 11/1973 | Grimaldi et al. | 215/223 |
| 4,145,834 | A | * | 3/1979 | Quigley | 43/73 |
| 4,208,828 | A | * | 6/1980 | Hall et al. | 43/114 |
| 4,232,472 | A | * | 11/1980 | Muelling | 43/61 |
| 4,253,264 | A | * | 3/1981 | Souza | 43/73 |
| 4,266,363 | A | * | 5/1981 | Chen | 43/73 |
| 4,483,093 | A | * | 11/1984 | Isborn | 43/58 |
| 4,612,724 | A | * | 9/1986 | Alboainin | 43/73 |
| 4,641,456 | A | * | 2/1987 | Boharski | 43/73 |
| 4,741,121 | A | * | 5/1988 | Pratscher et al. | 43/58 |
| 5,107,619 | A | * | 4/1992 | Zapata et al. | 43/81 |
| 5,148,625 | A | * | 9/1992 | Saleman | 43/121 |
| 5,185,953 | A | * | 2/1993 | Gross | 43/58 |
| 5,231,791 | A | * | 8/1993 | Falkson | 43/122 |
| 5,471,781 | A | * | 12/1995 | Vine | 43/69 |
| 5,560,146 | A | * | 10/1996 | Garro | 43/74 |
| 5,815,982 | A | * | 10/1998 | Garretson | 43/121 |
| 5,953,853 | A | * | 9/1999 | Kim | 43/98 |
| 6,016,623 | A | * | 1/2000 | Celestine | 43/61 |
| 6,088,948 | A | * | 7/2000 | Ronnau | 43/72 |
| 6,219,960 | B1 | * | 4/2001 | Contadini et al. | 43/121 |
| 6,343,434 | B1 | * | 2/2002 | Petti | 43/131 |

FOREIGN PATENT DOCUMENTS

| | | | |
|---|---|---|---|
| EP | 281744 | * | 9/1988 |
| GB | 2026833 | * | 2/1980 |
| GB | 2202123 | * | 9/1988 |

* cited by examiner

Primary Examiner—Peter M. Poon
Assistant Examiner—David Parsley
(74) Attorney, Agent, or Firm—Joseph H. Roediger; Gregory J. Nelson

(57) ABSTRACT

An automatic roach trap having a receiving container removably located in the trap enclosure. The trap utilizes a beam to detect roaches on a platform therein and actuates a mechanism to open an internal closure and coerce the roach into the underlying container. Access to the container is restricted during operation to prevent the escape of trapped roaches. The container is automatically closed upon withdrawal and designed to prevent inadvertent reopening during disposal.

24 Claims, 6 Drawing Sheets

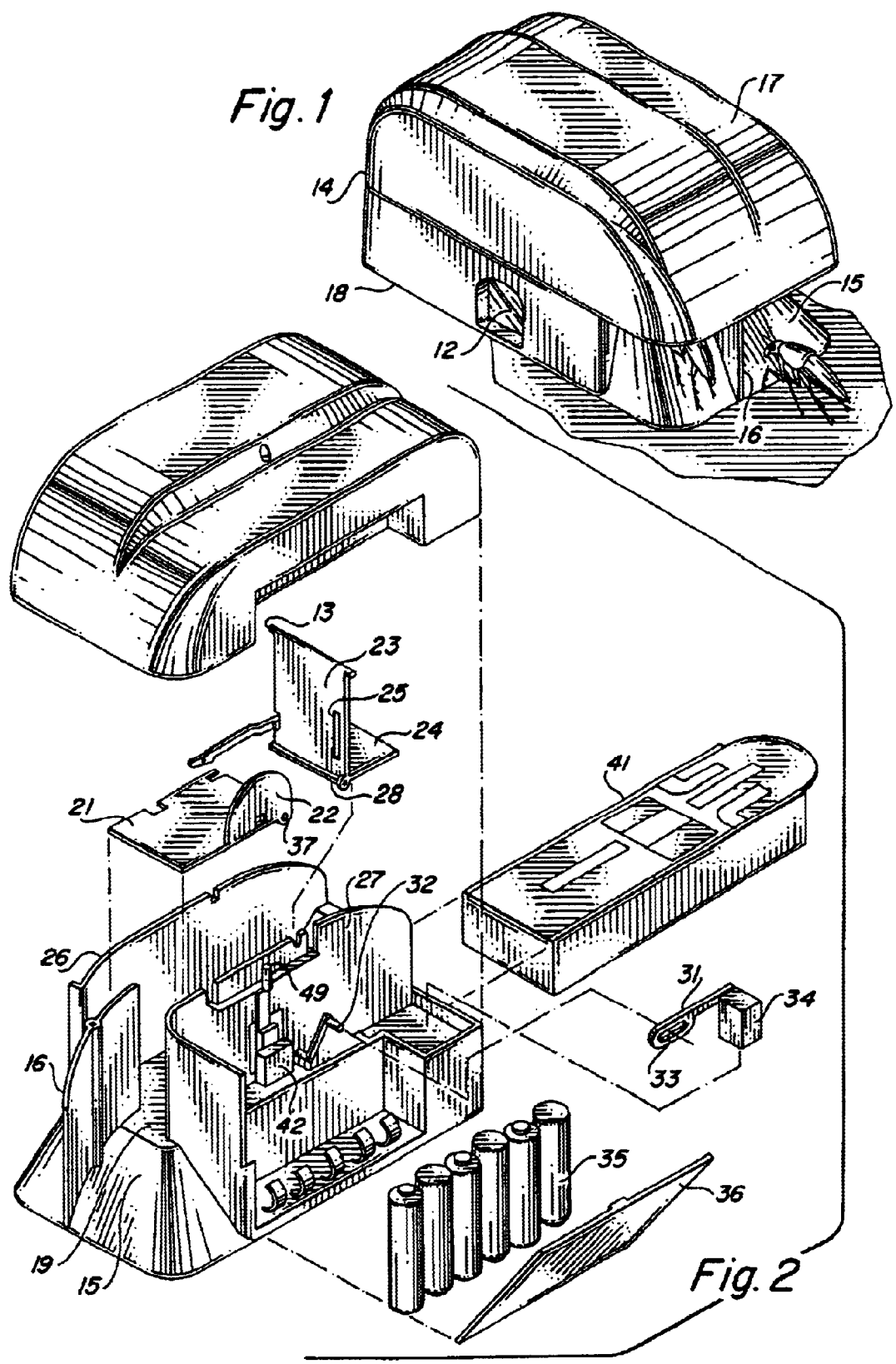

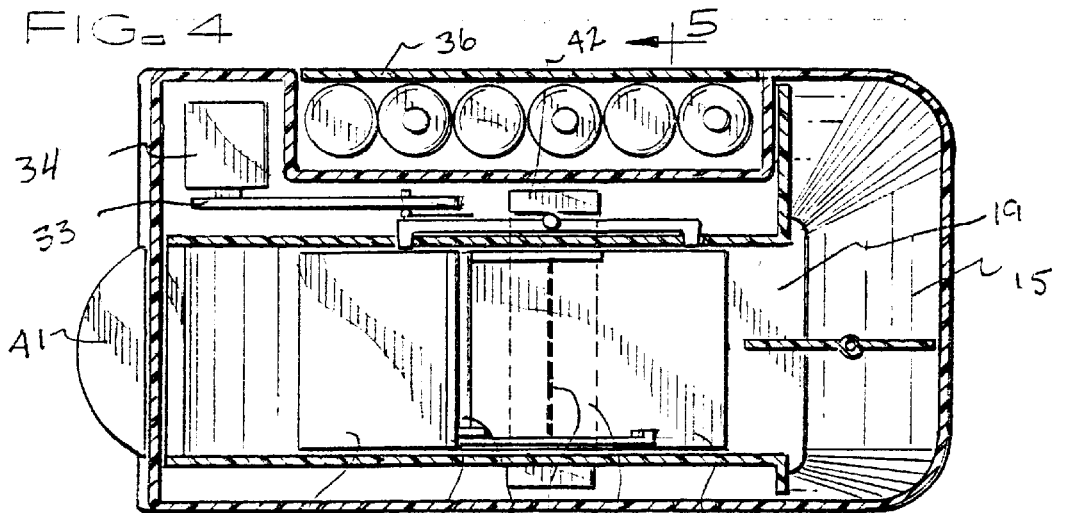
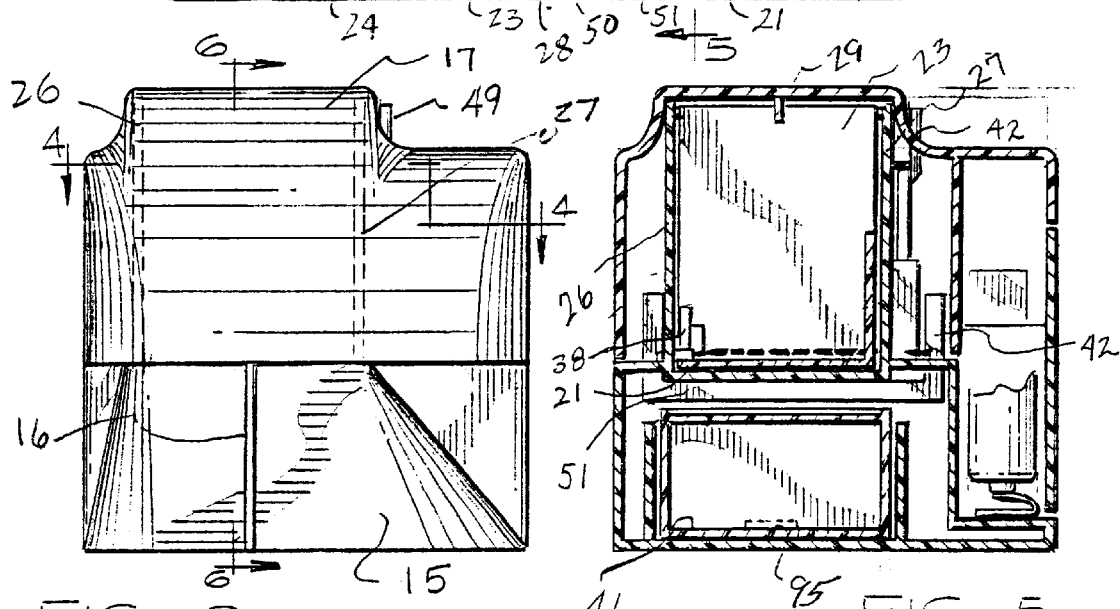
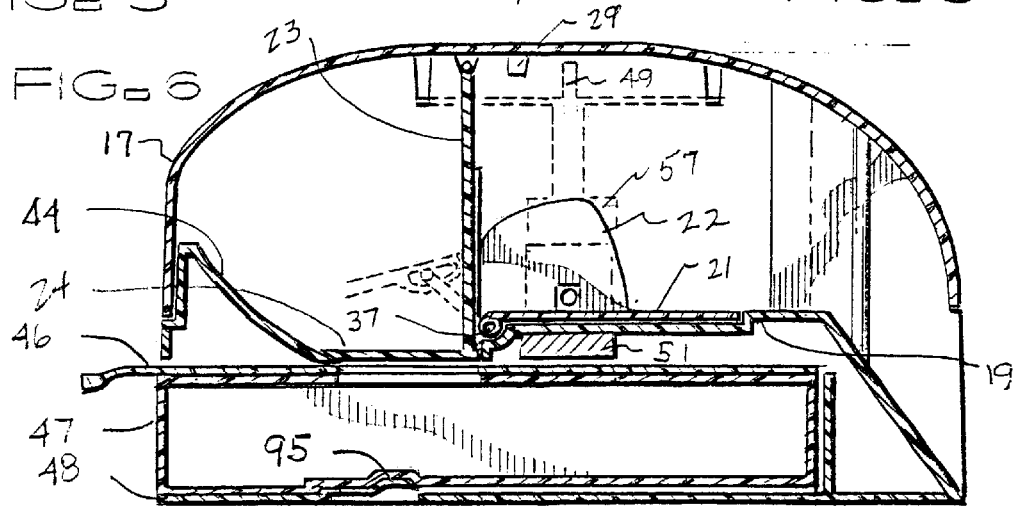

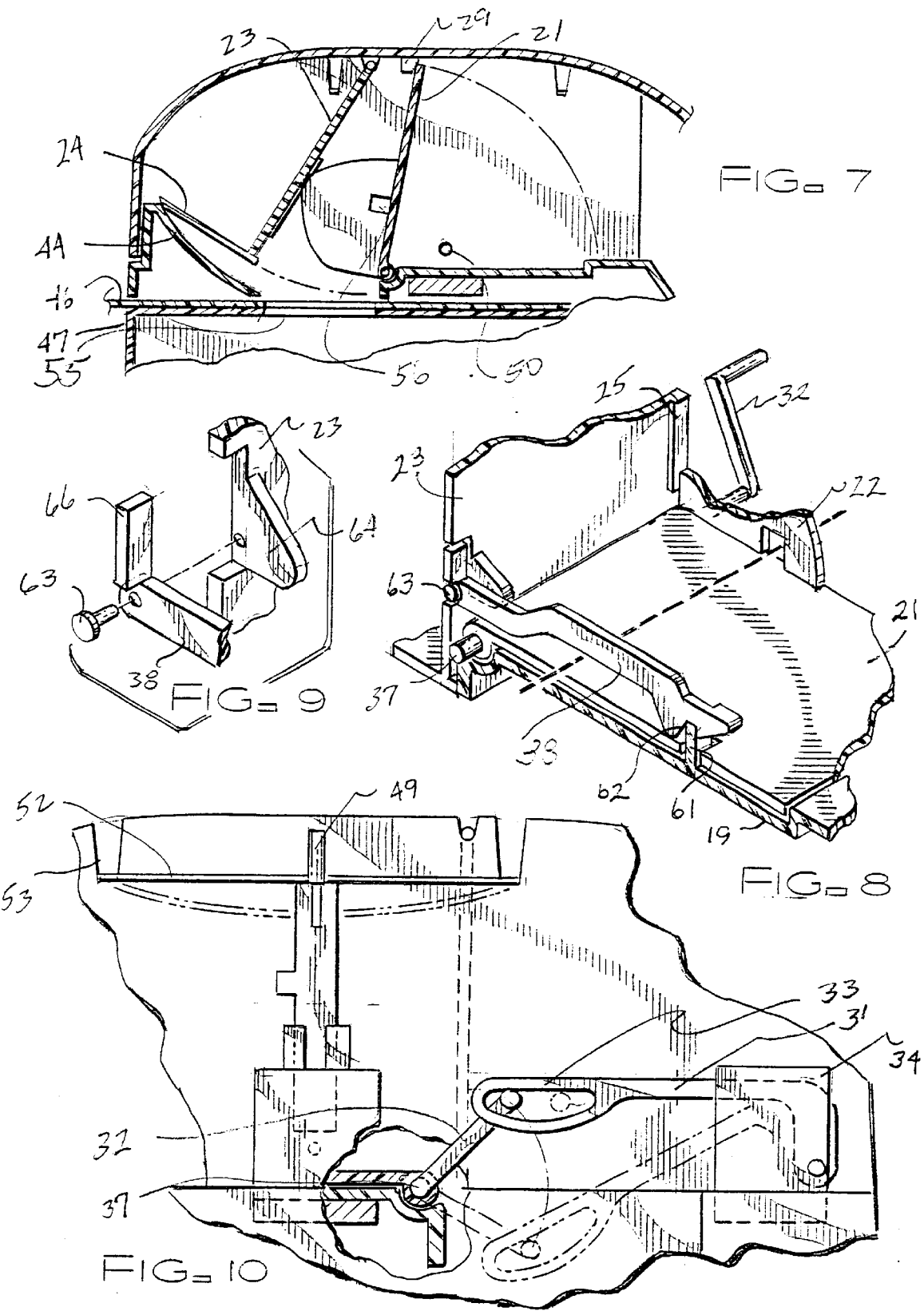

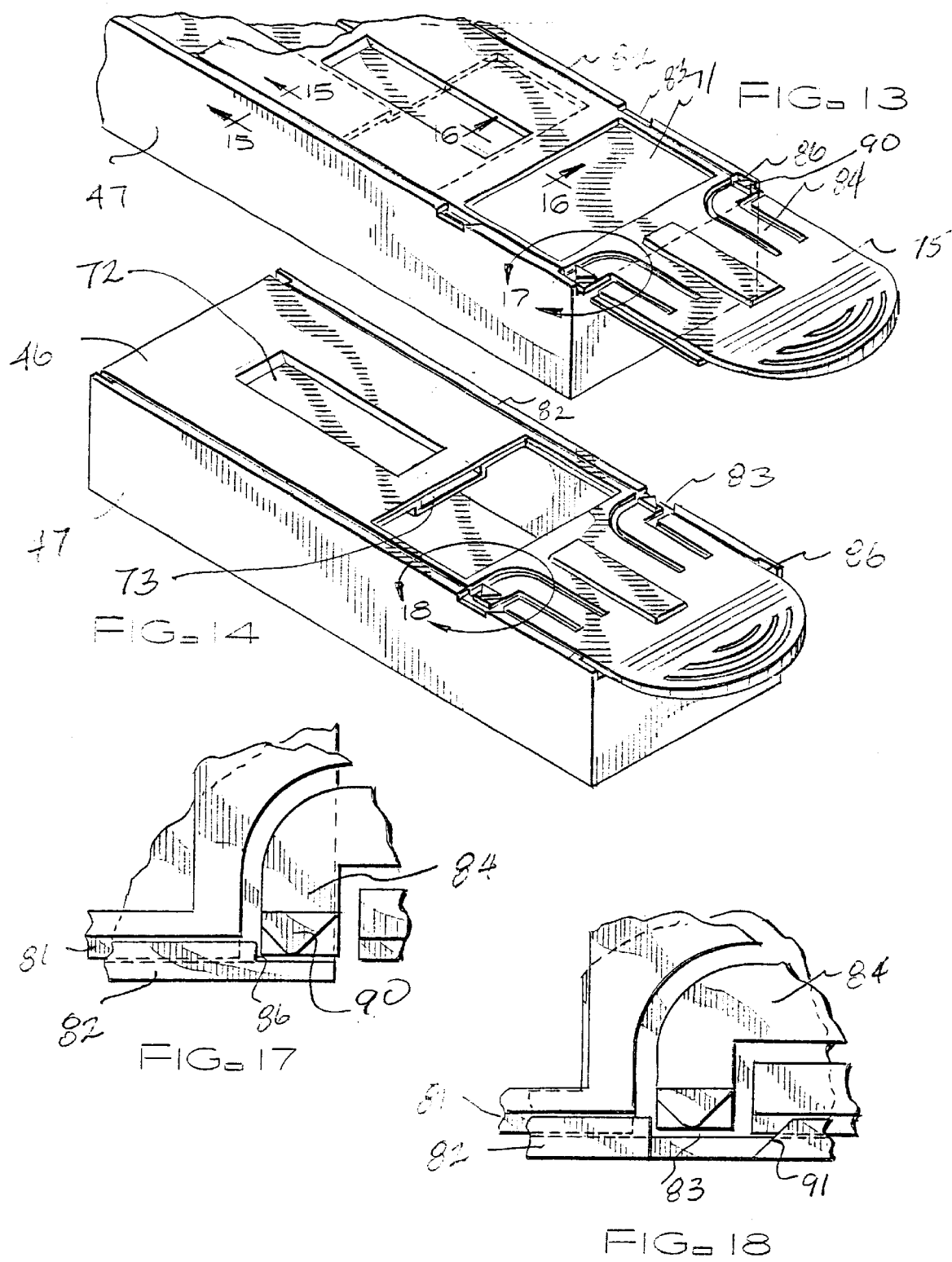

AUTOMATIC ROACH TRAP HAVING DISPOSABLE CONTAINER THEREIN

CROSS REFERENCE TO RELATED APPLICATION

The present invention is based on provisional patent application Ser. No. 60/243,987 filed Oct. 30, 2000.

BACKGROUND OF THE INVENTION

This invention relates to an automatic roach trap of the type wherein a roach entering the trap interrupts the beam of radiation to trigger coercive means which urges the roach into a disposable container. In particular, the invention is directed to a roach trap wherein the opening to the removable container is maintained in a closed position during periods of inactivity.

The interest in controlling the roach population in areas inhabited by man has been present as long as history has been recorded. The roach population has survived and, in fact, flourished despite repeated attempts to control it both through chemical and mechanical methods. Today, there is greater public recognition of the dangers inherent in the use of chemical insect control agents and increased attention is being directed to the use of mechanical trapping arrangements for insect control.

The durable roach exists in several varieties and different sizes. This insect continues to thrive despite the many attempts to provide a non-chemical approach to reducing its population. Not only do roaches belong to a variety of different species having a wide range in size, the roach is a remarkably adaptable insect capable of finding its way out of various trapping mechanisms. It is important that any trapping device maintain control over the trapped roaches since they have demonstrated an ability to exit through extremely small crevices and irregular openings.

One approach to trapping roaches is disclosed in my U.S. Pat. No. 5,815,982 wherein the trapping device compensates for the wide variation in size and weight of the roach by utilizing a beam of radiation to trigger the coercive mechanical sweep. The device described therein utilizes a movable barrier that is opened by the mechanical sweep. The bounded passageway along which the roach is urged has an opening that communicates with the opening in an underlying storage container. Thus, access between the storage container and the end of the bounded passageway is interdicted by a pivotal top mounted barrier door which rotates, when struck by the sweep, within a connecting chamber or vestibule. The captured roach is then free to drop down into the box area or remain within the vestibule. Upon rare occasions, a roach remaining in the vestibule could facilitate a rechallenge of the sweep mechanism if it evades the swinging barrier door. Even more of an annoyance was that the trap left the vestibule space available for any roach unwilling to move to the removable box.

Accordingly, the present invention is directed to the provision of an automatic roach trap provided with means to continually close off the underlying storage container so that roaches can not reenter the passageway thereto. In addition, the present container is provided with a cover that is movable in relation to the underlying roach receiver so that the container is automatically closed as the user withdraws the container from the trapping device. Also, the invention provides a mechanical test for the user to readily verify battery and trap functionality.

SUMMARY OF THE INVENTION

The present invention is directed to an automatic roach trap having a removable container to receive and retain trapped roaches within the bounded enclosure forming the roach trap. The enclosure has two levels with an intermediate floor between its top member and base member. The removable container is located in an access port in one of the enclosure walls and located beneath an opening in the floor.

A tilt platform is located in the enclosure adjacent the entryway for the roaches. A first opening is located in the floor adjacent the platform and a movable barrier is pivotally mounted between the opposing sidewalls. The barrier is located between the platform and the first opening. The free end of the barrier adjacent the floor has a closure member affixed thereto. This member overlays the first opening so that the opening is closed when the barrier is in the inactive position. Thus, roaches are unable to leave the removable container once deposited therein. In addition, the barrier is releasably coupled to the enclosure when the platform is not active. As the platform is driven into a tilt position, the barrier is then released for movement.

The bounded enclosure includes means for detecting the presence of a roach on the platform and provides an actuating signal to drive means that is operatively connected to the barrier. When the presence of a roach is detected, the drive means causes the platform to tilt, the barrier to move and the closure member to permit the addition of a roach to the container. The tilt platform prevents roaches from exiting through the entryway during actuation. In addition, the floor of the enclosure has an arcuate curved region which conforms to the arcuate path of the closure member to prevent roaches from exiting the container and seeking to leave the enclosure by a circuitous route.

The removable container includes a receiver dimensioned for placement in the access port with a movable cover supported thereon by guides located on opposing sides of the receiver. The receiver contains a first stop which limits the movement of the cover in one direction due to a projection mounted on the cover. A hand-grippable tab is provided on the cover so that the cover is moved from open to close position prior to withdrawal from the access port. During withdrawal, the projection mounted on the cover contacts the edge of the opening in the receiver thereby providing a second stop when the cover is in the closed position.

The removable container further includes engaging means mounted on the cover for contacting and maintaining the cover in the closed position so that it is not inadvertently opened by the user. The engaging means includes a pair of L-shaped prongs located on a opposing edges of the covers with the prongs being urged inwardly by the guides when the cover moves between open and closed positions. The prongs each include a cam mounted thereon for contact with the guides during movement. The bounded enclosure is provided with a releaseable detent on its base member. This detent engages a mating recess in the bottom of the removable container to both insure registration of the container opening with the opening in the floor of the bounded enclosure and also to enable the force supplied to the tab by the user to move the cover to its closed position before overcoming the restraining force applied by the detent. When the movement of the tab causes the prongs to travel along the guides and the cover contacts the stop, the withdrawal of the closed container from the access port takes place. Thus, the present invention essentially eliminates the opportunity for trapped roaches to exit the storage container during operation of the roach trap and further insures that the removable container is in its closed position when withdrawn for disposal.

Further features and advantages of the invention will become more readily apparent from the following detailed description of a preferred embodiment when viewed in conjunction with the accompanying drawings.

BRIEF DESCRIPTION OF THE DRAWINGS

FIG. 1 is a view in perspective of a preferred embodiment of the present invention showing roaches in the entryway thereof.

FIG. 2 is a exploded view of the embodiment of FIG. 1.

FIG. 3 is a view of the front of the embodiment shown in FIG. 2.

FIG. 4 is a top cross sectional view taken along line 4—4 of FIG. 3.

FIG. 5 is a front cross sectional view taken along line 5—5 of FIG. 4.

FIG. 6 is a side cross sectional view taken along line 6—6 of FIG. 3.

FIG. 7 is partial side view showing the movement of the tilt platform and moveable barrier of FIG. 6.

FIG. 8 is a partial view in perspective of the drive and latching means of the tilt platform of FIG. 7.

FIG. 9 is an expanded view in perspective of the pivot of the latching means shown in FIG. 8.

FIG. 10 is a partial side view showing the drive means of the present embodiment.

FIG. 13 is a view in perspective showing the removable container in the closed position.

FIG. 14 is a view in perspective showing the removable container in an open position.

FIG. 17 is an expanded view of the prong shown in FIG. 13.

FIG. 18 is an expanded view of the prong shown in FIG. 14.

DESCRIPTION OF THE PREFERRED EMBODIMENT

Figure 15:
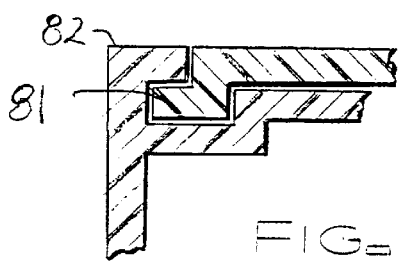
FIG. 15 is a cross sectional view of the guide taken along line 15—15 of FIG. 13.

Referring now to the embodiment shown in FIG. 1, the roach trap includes a bounded enclosure 14 having a curved top member 17, a base member 18 and walls extending therearound. The entryway 15 is shown with a partition 16 dividing the entryway into two discrete areas. The roaches are shown entering the bounded enclosure 14. One of the side walls is provided with a transparent viewing window 12 which enables the user to view the removable container contained in the device. For ease of assembly, the parts are made of molded plastic with the constructional features shown more clearly in FIG. 2 which is an exploded view showing the curved top member overhanging the entryway 15.

In FIG. 2, the entryway 15 is an inclined plane to the intermediate floor 19 which receives tilt platform 21 thereon as shown by the dotted outline. The bounded enclosure for trapping is formed by sidewalls 26 and 27 and a portion of the curved top member 17. The partition 16 extends up the entryway 15 and terminates on floor 19 before reaching the tilt platform. A driven arm 32 extends through sidewall 27 and engages a shaft 37 mounted in the end of the tilt platform. The driven arm 32 is positioned in a keyway 33 formed in the end of drive arm 31. The drive arm is coupled to drive motor 34. The embodiment is powered by six batteries 35 which are contained in the side of the roach trap and held in position by conventional contacts and the access cover 36. The batteries also operate the emitter-detector pair 42 which establishes the beam of radiation across the tilt platform.

Figure 11:
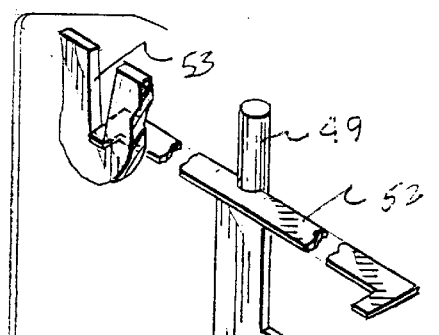
FIG. 11 is a detail view in perspective showing the beam interrupter shown in FIG. 10.

A beam actuated by plunger 49 is positioned just above the emitter-detector 42 and is manually operable to enable the user to determine if the batteries are sufficiently charged to operate the device. In normal operation, the device as seen in FIG. 11 is continually operational so that the manual interrupter triggers the tilt platform to indicate that sufficient power remains. Activation followed by no movement of the tilt platform 21 in indicates that batteries need to be replaced.

The movable barrier 23 is pivotally mounted in notches in the side walls 26 and 27. At the lower or free end of the movable barrier is a closure member 24 which serves to provide a barrier to any roaches previously trapped. As shown in FIG. 2, the movable barrier has lateral extensions 13 which serve to support the barrier in the notches. The movable barrier is positioned adjacent to contact disk 22 which is affixed to the tilt platform. The curve on contact disk 22 causes the disk to rotate and urge the movable barrier away from the vertical position. A reinforcing ridge 25 is provided on the movable barrier for engagement with the disk and to provide clearance between the two moving parts.

Turning now to FIG. 3, the entryway 15 is shown divided by partition 16. The cover 17 is shown with the actuating plunger 49 for the beam interruption operation extending upwardly therefrom. The sidewalls 26 and 27 are shown in dashed outline. The view taken along line 4—4 of FIG. 3 shows the general layout of the trapping mechanism. The entryway 15 terminates at the horizontal floor 19. The opposing sidewalls have lateral extensions so the entering roaches are directed to encounter the tilt platform 21. The heavy-outline 50 crossing the tilt platform is the path of the beam of radiation from the emitter detector pair 42 located on the outside of the sidewalls and transmitting the beam through openings therein. The movable barrier 23 with the closure member extending therefrom is adjacent the tilt platform. As shown, a contact lip 28 is provided on the barrier member to contact the tilt platform and maintain the barrier in a vertical position. The circuit board 51 containing the electrical components for signal processing is shown in the light-dashed lines and is mounted beneath the floor 19. The wiring connections to drive motor 34 are not shown and reside in the space between the battery assembly and the side wall as seen in FIG. 5. As shown therein, the curved top member is provided with a limit stop 29 centrally located. This stop limits the angle of tilt of the tilt platform 21 when actuated. The contact disk is provided at the edge of tilt platform 21 so that a tilting of the platform causes the contact disk to urge the vertically positioned movable barrier to its open position. The removable container 41 is shown in its underlying position beneath the floor.

In FIG. 6, the floor 19 is shown with a contour or recess that permits the tilt platform to rest thereagainst in the same plane as floor 19 so that the roach does not encounter any discontinuity. The termination of the intermediate barrier provided by the floor 19 is a curved section 44 which extends upwardly and is in conformance with the arcuate path of the closure member 24. Upon interruption of the beam, the tilt platform 21 rotates about shaft 37 and contact disk 22 causes the movable barrier 23 to rotate on its pivot. The closure member moves along the arcuate section of 44 of floor 19. This prevents previously trapped roaches residing in the underlying container from exiting the device. The stop 29 located on the top member 17 serves to limit the angle of tilt platform 21 and provides a jarring force to any roach residing thereon. As a result, a roach is dislodged from the tilt platform and drops through the opening in the floor into the container. It is to be noted in FIG. 6 that the beam interrupting plate 57 is shown in dashed outline connected to the plunger 49.

The movement of the tilt platform and movable barrier is shown more clearly in FIG. 7 wherein the tilt platform 21 is rotated to the limit stop 29 with the contact disk urging the movable barrier out of its vertical position. As a result, the roach is deposited in the underlying container through opening 55 in the cover 46 and into receiver 47. It is to be noted that the contact disk has an opening therein 56 which allows the beam 50 to extend across the tilt platform.

The ability of roaches to escape from mechanical traps has created problems in the past when the trapping mechanism is to be operating without attention over a long period of time. Heretofore, entrapped roaches have managed to find a path to escape when the device is accepting or trapping another roach. The present invention utilizes the combination of the curved floor 44 and the closure member 24 to maintain control during trapping of roaches that have been previously trapped. The return movement of the movable barrier 23 and the corresponding movement of the closure member 24 causes roaches to return to the container. When the tilt platform returns to its rest position on floor member 19, a latching mechanism is used to maintain the movable barrier in a vertical position. In FIG. 8, the barrier 23 is shown vertical with the tilt platform return to its rest position. A tab 61 extends upwardly from the floor 19 through a mating notch in platform 21 to engage the free end of locking arm 38. As shown, the arm is pivotally coupled to the movable barrier. FIG. 9 shows barrier 23 to have a reinforcing tab 64 which receives pivot pin 63 in a mating hole. The sealing tab 66 is located on the end of locking arm 38 to seal the clearance opening formed in the barrier. The movable arm contains a beveled notch 62 which releaseably engages tab 61. As platform 21 is driven to a tilt position, the locking arm moves along with the tilt platform and frees itself from the tab 61 thereby permitting the barrier 23 to be driven by contact disk 22. The tilt platform rotates about shaft 37 which is coupled to the driven arm 32. In FIG. 10, the drive mechanism for the tilt platform about shaft 37 is shown. The shaft is coupled to the driven arm 32 which has a lateral extension that resides in keyway 33 of drive arm 31. The drive arm is affixed to the drive motor 34. When a roach interrupts the beam of radiation across the tilt platform, the drive motor is actuated and the drive arm is rotated to the dashed position in FIG. 10. As a result, the keyway forces the driven arm 32 downwardly causing rotation of the platform about the access of shaft 37. As mentioned previously, the angle of tilt of the platform 21 is limited by the limit stop 29 located on the underside of the cover. Also shown in FIG. 10 is the beam interruption plunger 49 with its transverse support 52 having tabs which are received in the notches 53 of the side wall. As seen in FIG. 11, the transverse support with the ends thereof in the notch is a flexible member so that pressure exerted on the plunger causes the blocking member 57 to move vertically within guides 59. A limit tab 58 is provided as a safety measure to prevent overstressing of the flexible transverse support 52. In the at rest or normal position, the transverse support is horizontal and the blocking member 57 does not interrupt the beam 50. The interruption of the beam results in actuation of the tilt platform if the batteries have sufficient stored charge. If the batteries need replacement, no reaction takes place and the user knows that it is time to replace batteries.

The electrical schematic for the circuitry used in the above-described embodiment is shown in FIG. 14 of my prior U.S. Pat. No. 5,815,982. The operation of the circuitry is the same with the interruption of the beam providing a signal to a logic circuit which causes the drive motor to be actuated. In the embodiment shown, the return of the tilt platform to its original position is effected by the movement of the keyway. The movable barrier utilizes a gravity return and the locking arm reengages the tab 61 as seen in FIG. 8.

Figure 12:
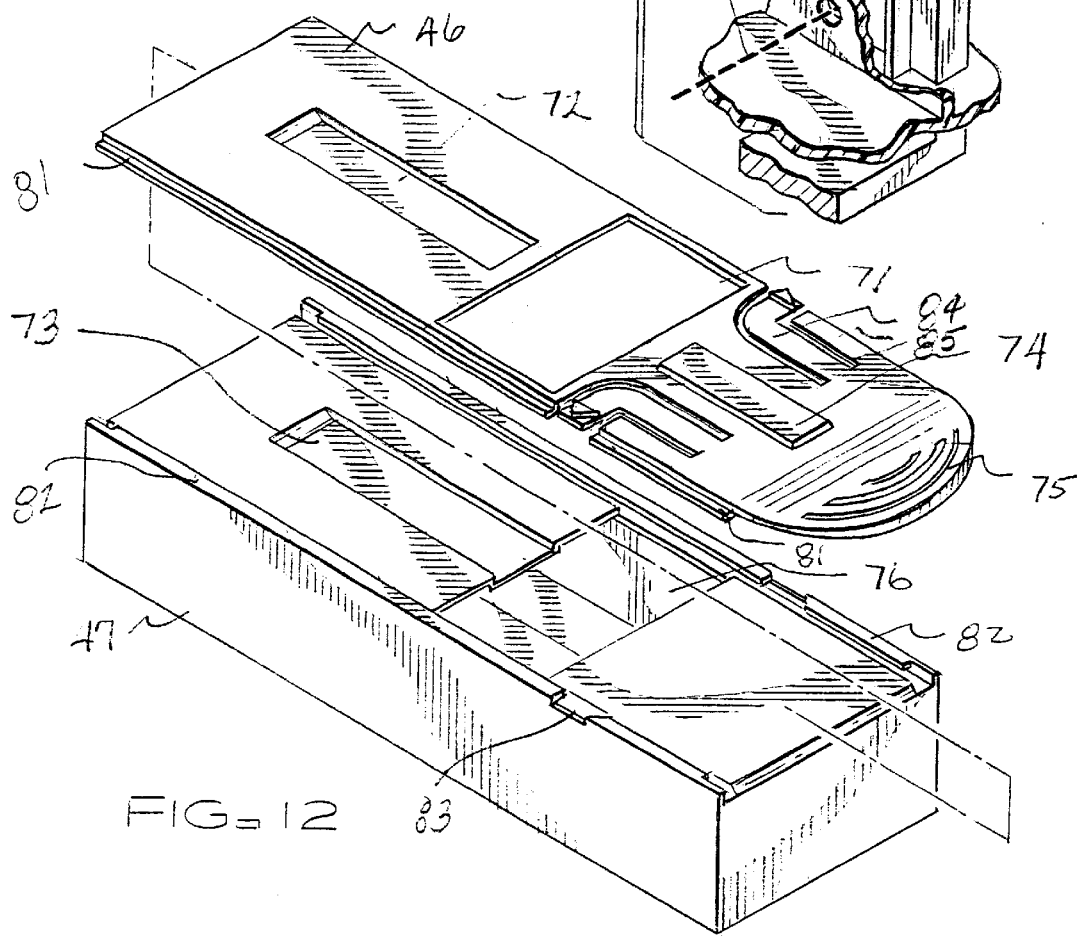
FIG. 12 is a view in perspective showing the removable container with the cover separated therefrom.

The removable container 41 shown in FIG. 1 is described in greater detail in FIG. 12 wherein cover 46 is shown removed from receiver 47. The receiver is a container having a large area opening 76 in the top surface with a channel 73 centrally positioned therein and extending to the opening. As will later become more apparent, the channel serves to establish a first stop for the cover when it is inserted into guides 82. The guides are provided on opposing edges of the receiver 47 and extend substantially the entire length thereof. In the embodiment shown, the guides terminate short of the ends of the receiver. In addition, a cutout section 83 is provided in each guide near the front of the container. The overlying cover 46 includes a centrally located projection 72 which extends downwardly and is matingly received in the channel 73 of the receiver. An opening 71 is provided in the cover adjacent to the end of the projection. Next to the opening is the releaseable engaging means for the cover which includes a pair of L-shaped prongs 84 separated from the adjacent material by slots 85. Intermediate the prongs 84 is an elongated tab 74 which serves as a guide during insertion and removal. A hand-grippable tab 75 completes the cover. In operation, the cover is inserted into the guides 82 and urged into its open position wherein the openings 71 and 76 are in alignment.

Figure 16:
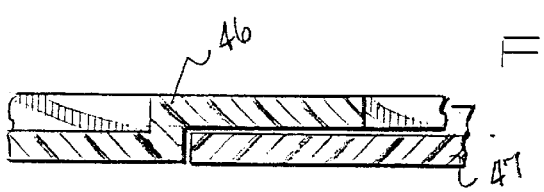
FIG. 16 is a partial cross sectional view taken along line 16—16 of FIG. 13.

The insertion of the cover 46 into the receiver 47 is shown in FIGS. 13, 14 and 15. In FIG. 13, the edge sections 81 of the cover have been inserted into the mating guides 82 and the tab is used to urge the cover into position. No resistance is met to achieve the position shown in FIG. 13. However, at that point, the L-shaped prongs on either side of the cover enter into contact with the adjacent detents 86. By urging the prongs 84 inwardly by means of the triangular projections 90 formed thereon, the projections pass the detents and the cover can be moved to the open position shown in FIG. 14. The term open position is used to describe the condition where the two openings are in alignment so that access to the interior of the container is available. When the cover and receiver are in the open position, the projection on cover 46 is received in the channel 73 to both maintain alignment during relative movement and to provide a stop for the cover so that in the open position, the openings are in alignment. Also, the projection travels along the channel when the cover is moved to the position shown in FIG. 13 with the projection contacting the edge of the opening in the receiver 47 thereby forming a second stop as seen in FIG. 16.

Figure 19:
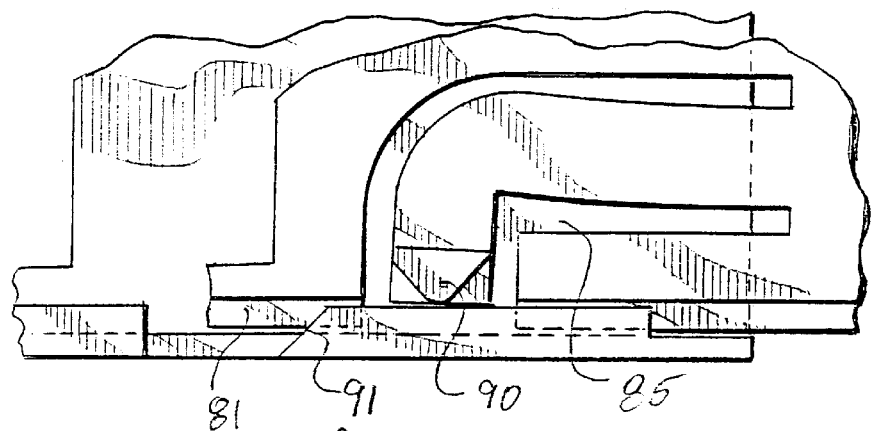
FIG. 19 is an expanded view showing the prong urged inwardly by the guide in the removable container.

The positions of the prongs 84 and the projections located on the outer ends thereof are seen in FIGS. 17, 18 and 19.

When the cover is closed as shown in FIG. 13 with the tab having been used to withdraw the cover to cause misalignment of the openings, the end of prong 84 rests at detent 86. To reopen the container requires the application of force to the prongs so as to overcome the effect of the detent. When the cover is in the open position, each prong and its triangular projection reside within a cutout section 83 of a guide 82. A camming surface 91 is provided to contact the triangular projection on the prong and urge it inwardly in the manner shown in FIG. 19. This enables the cover to be moved from the open to closed position. As shown, the prongs are bounded by slots 85 which enable inward movement into the bounding slots. In summary, the cover is initially in the open position and the user inserts it into the roach trap enclosure. When trapping has occurred and the user wishes to withdraw the removable container from the device, the tab 75 is pulled so that the camming action causes the prongs to move inwardly and the cover is partially withdrawn and the openings are non-aligned. As mentioned, the closed position for the removable container is shown in FIG. 13. The user is prevented from inadvertently returning the cover to the open position by the detents 86 located at the ends of the receiver guides 82.

Figure 20:
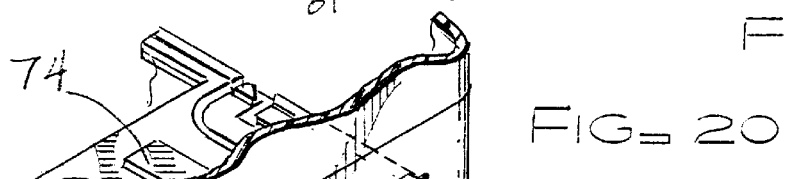
FIG. 20 is a partial view in perspective showing the removable container in the access port.
Figure 22:
FIG. 22 is a partial top view in section taken along line 22—22 of FIG. 21.
Figure 21:
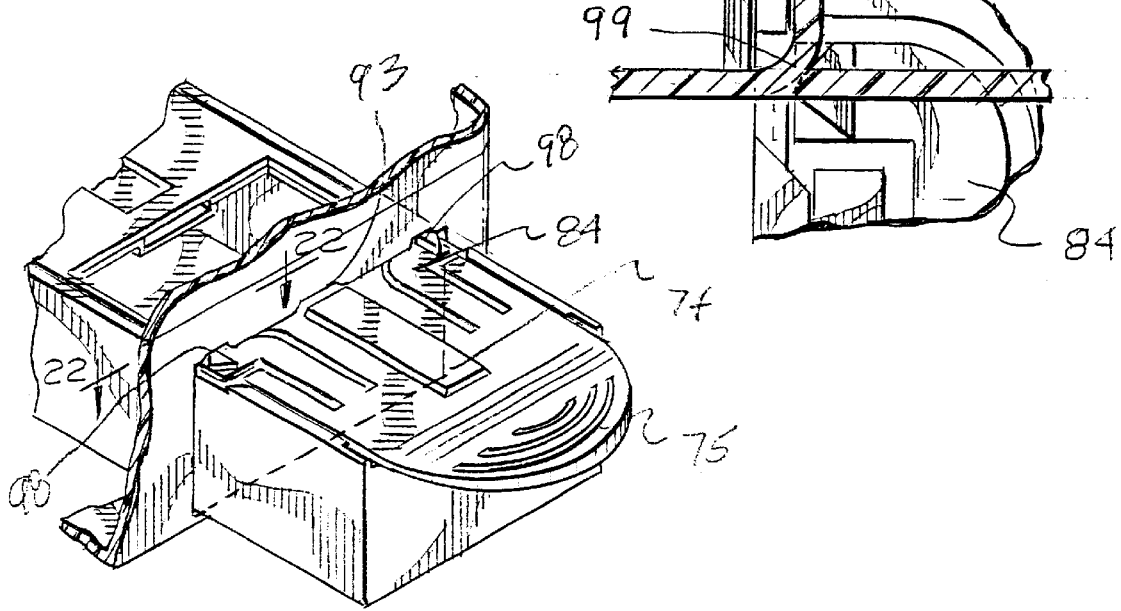
FIG. 21 is similar to FIG. 20 with the container partially removed.

Referring now to FIGS. 20, 21 and 22, the interaction of the device enclosure with the removable container is shown in further detail. The cover contains an elongated tab 74 intermediate the prongs 84. An alignment notch 93 is provided in the central portion of the exterior wall to maintain the alignment of the cover, receiver and enclosure wall during insertion and removal of the container. The relative movement between cover and receiver takes place while the container is within the device enclosure. The container is also provided with a centrally located elongated channel on its bottom surface which engages a biased detent 95 formed on the bottom of the device enclosure. The biased detent 95 is shown in FIGS. 5 and 6. The molded plastic enclosure enables an inwardly displaced protrusion to be formed on the bottom for use in guiding the container by riding in the channel. The receiver is provided with a mating recess at a particular location in the channel to appropriately position the receiver within the device enclosure. Continued application of force to the tab 75 causes the closed container to overcome the force of the protrusion 95 and permit withdrawal of the container. Thus, the container is prevented from inadvertent displacement during operation. In addition, internal guides can be used within the device enclosure to further maintain the cover in alignment and to maintain the prongs in position during continued use. For example, the access port for the removable container is provided with recesses 98 to allow passage of the projections 90 therethrough. Further, the entry at the access port is facilitated by the use of radius corners 99 as shown in FIG. 22. The radius corners together with recesses 98 inwardly urge the L-shaped prongs 84 to facilitate insertion of a closed container.

While the above-description has referred to a specific embodiment of the invention, it is recognized that many modifications and variations may be made therein without departing from the scope of the invention as claimed.

What is claimed is:

1. An automatic roach trap for use in connection with a removable container, said trap comprising:
  a) a bounded enclosure having a top member, a base member, and a floor positioned above the base member, said enclosure having a front wall, rear wall and side walls, an access port located in one of said walls between the floor member and the base member for receiving a removable container therein; an entryway located in the front wall to admit roaches to the floor;
  b. a first opening in the floor;
  c. a bounded passageway located on said floor and extending between the entryway and first opening;
  d. a tilt platform received in the floor at a location intermediate the entryway and the first opening, said tilt platform being positioned coplanar with the floor and mounted for rotation about an axis adjacent the first opening;
  e. a movable barrier mounted in said passageway intermediate the entryway and the first opening and having a free end adjacent the floor, said barrier being operatively connected to the tilt platform for movement from a rest position;
  f. a closure member affixed to the free end of the barrier and overlying the first opening when the barrier is in the rest position;
  g. drive means operatively connected to the tilt platform for imparting movement thereto whereby said closure member moves from a position over the first opening, and
  h. means for detecting the presence of a roach on said platform and providing an actuating signal to the drive means whereby the platform rotates causing movement of the barrier and closure member and the roach is urged through the first opening into the container.

2. The automatic roach trap in accordance with claim 1 wherein said means for detecting comprises an emitter-detector pair positioned to establish a beam of radiation across the platform and provide an actuating signal to the drive means upon interruption of the beam.

3. The automatic roach trap in accordance with claim 2 further comprising means for manually interrupting the beam of radiation, said means extending outwardly of the bounded enclosure.

4. The automatic roach trap in accordance with claim 1 further comprising a contact disk mounted on the platform, said disk urging the movable barrier open upon tilting of the platform.

5. The automatic roach trap in accordance with claim 4 wherein said movable barrier is pivotally mounted to the side walls of the enclosure and said closure member affixed thereto moves in an arcuate path when the barrier is urged open.

6. The automatic roach trap in accordance with claim 5 further comprising a releaseable locking arm pivotally coupled to the movable barrier for releaseable engagement with a tab affixed to said enclosure, said locking arm being contacted by the platform during movement thereof.

7. The automatic roach trap in accordance with claim 6 wherein the tilt platform contains a slot, and further comprising a tab affixed to the floor and extending through the slot for releaseable engagement with the locking arm.

8. The automatic roach trap in accordance with claim 7 wherein said floor has a arcuate curved region adjacent the rear wall of the enclosure and spaced from the movable barrier, the arcuate curved region substantially conforming to the arcuate path of the closure member.

9. The automatic roach trap in accordance with claim 8 further comprising a limit stop affixed to the roof member for limiting the tilt of the platform.

10. The automatic roach trap in accordance with claim 9 wherein said platform is pivotally mounted for rotation about a transverse axis and said drive means further comprises a drive arm having a keyway and a driven arm coupled thereto, said driven arm being connected to the platform.

11. The automatic roach trap in accordance with claim 10 further comprising a releaseable detent mounted in the base member proximate to the access port for engagement by a container.

12. The automatic roach trap in accordance with claim 11 further comprising a releaseable container dimensioned for placement in the access port, said container having a front end, a rear end and top and bottom surfaces, said bottom surface containing a channel therein for engagement with said detent.

13. The automatic roach trap in accordance with claim 12 wherein said container further comprises:
   a. first and second parallel guides located on opposing sides of the top surface, said guides extending upwardly from the top surface, said top surface having a stop thereon;
   b. a cover having opposing edges and a second opening therein, said cover being mounted in said guides for movement between open and closed positions on the container, the open position placing the second opening in general alignment with said first opening in the floor;
   c. a tab affixed to said cover and extending outwardly thereof to facilitate movement of the cover on the container; and
   d. a projection mounted on the cover for contacting the stop on said top surface when the cover is moved to the closed position on the container, the application of force to the tab releasing the detent and permitting withdrawal of the container in a closed position.

14. In an insect trapping device having an access port for the insertion of a removable container to receive trapped insects, a removable container comprising:
   a. a receiver dimensioned for placement in an access port and having a front end, a rear end and top and bottom surfaces, the top surface containing a first opening;
   b. first and second guides located on opposing sides of the top surface, said guides extending upwardly from the top surface;
   c. a cover having opposing edges and a second opening therein, said cover being mounted in said guides for movement between open and closed positions, the open position placing the second opening in general alignment with the first opening of the receiver;
   d. a tab affixed to said cover and extending outwardly of the receiver to facilitate movement of the cover on the receiver to the closed position; and
   e. a projection mounted on the cover for contacting the receiver when the cover is moved to the closed position on the receiver, the application of force to the tab providing initial movement of said cover on said receiver to the closed position followed by withdrawal of the removable container in the closed position from the access port.

15. The removable container in accordance with claim 14 wherein said projection contacts the edge of the first opening when the cover is moved to the closed position.

16. The removable container in accordance with claim 15 further comprising engaging means located on said cover for contacting and maintaining said cover in the closed position.

17. The removable container in accordance with claim 16 wherein said engaging means comprises at least one prong which contacts the receiver when the cover is in the closed position.

18. The removable container in accordance with claim 17 further comprising first and second prongs located on opposing edges of the cover, said prongs being urged inwardly by said guides when the cover moves between open and closed positions.

19. The removable container in accordance with claim 18 wherein said first and second guides include first and second interior gaps respectively, said interior gaps receiving said prongs when the cover is in the open position.

20. The removable container in accordance with claim 19 wherein the first and second prongs each include a cam mounted thereon for contact with the first and second guides respectively, the application of force to the tab urging the prongs inward of the cover.

21. The removable container in accordance with claim 20 wherein the first and second guides include a detent located proximate to the rear end of the receiver for maintaining the cover in the closed position.

22. The removable container in accordance with claim 17 wherein said at least one prong is an L-shaped prong formed in said cover and bounded by openings to permit bidirectional movement.

23. The removable container in accordance with claim 22 further comprising first and second prongs formed in said cover.

24. The removable container in accordance with claim 23 wherein the first and second prongs each include a cam mounted thereon for contact with the first and second guides respectively, the application of force to the tab urging the prongs inward of the guides.

* * * * *